United States Patent [19]

Gardner-Chavis et al.

[11] Patent Number: 5,234,671

[45] Date of Patent: * Aug. 10, 1993

[54] REDUCTION OF NITROGEN OXIDE IN EFFLUENT GASES USING FORMALDEHYDE AND/OR FORMALDEHYDE-DERIVED FREE RADICALS

[75] Inventors: Ralph A. Gardner-Chavis, Cleveland; Michael P. May, Canton, both of Ohio

[73] Assignee: Molecular Technology Corporation, Canton, Ohio

[ * ] Notice: The portion of the term of this patent subsequent to Jan. 7, 2009 has been disclaimed.

[21] Appl. No.: 725,558

[22] Filed: Jul. 3, 1991

Related U.S. Application Data

[63] Continuation-in-part of Ser. No. 585,592, Sep. 20, 1990, Pat. No. 5,078,982, and a continuation-in-part of Ser. No. 585,403, Sep. 20, 1990.

[51] Int. Cl.$^5$ .......................... B01J 8/00; C01B 21/00; B01D 53/34
[52] U.S. Cl. .................. 423/239.1; 423/235; 422/168
[58] Field of Search .............. 423/235, 235 D, 239 A, 423/239; 422/168

[56] References Cited

U.S. PATENT DOCUMENTS

| | | | |
|---|---|---|---|
| 3,867,507 | 2/1975 | Myerson | 423/212 |
| 3,900,554 | 8/1975 | Lyon | 423/235 |
| 4,208,386 | 6/1980 | Arand et al. | 423/235 |
| 4,325,924 | 4/1982 | Arand et al. | 423/235 |
| 4,335,084 | 6/1982 | Brogan | 423/235 |
| 4,350,669 | 9/1982 | Izumi et al. | 423/235 |
| 4,719,092 | 1/1988 | Bowers | 423/235 |
| 4,731,231 | 3/1988 | Perry | 423/235 |
| 4,743,436 | 5/1988 | Lyon | 423/235 |
| 4,800,068 | 1/1989 | Perry | 422/173 |
| 4,849,192 | 7/1989 | Lyon | 423/235 |
| 4,851,201 | 7/1989 | Heap et al. | 423/235 |
| 4,861,567 | 8/1989 | Heap et al. | 423/235 |
| 5,078,982 | 1/1992 | Gardner et al. | 423/235 |

FOREIGN PATENT DOCUMENTS

| | | | |
|---|---|---|---|
| 654427 | 12/1962 | Canada | 23/2 |
| 53-76968 | 7/1976 | Japan | 53/34 |
| 52-14619 | 2/1977 | Japan | 53/34 |
| 52-42461 | 4/1977 | Japan | 53/34 |
| 53-128023 | 11/1978 | Japan | 53/34 |
| 54-46172 | 4/1979 | Japan | 53/54 |
| 1-99633 | 4/1989 | Japan | 423/239 |
| 1572118 | 7/1980 | United Kingdom | 53/54 |

OTHER PUBLICATIONS

"Reducing NO$_x$ Emissions," *Power*, Sep. 1988, pp. S-1 to S-13.
R. A. Perry adn D. L. Siebers, *Nature*, vol. 324, 18-25, pp. 657, 658. (No date).

Primary Examiner—Gregory A. Heller
Attorney, Agent, or Firm—Renner, Otto, Boisselle & Sklar

[57] ABSTRACT

An improved method is described for reducing the nitrogen oxide content of an effluent gas stream wherein the temperature of the gas varies. The improvement comprises alternately, depending upon the temperature of the gas, contacting the gas with (A) formaldehyde when the gas is at an elevated temperature which is sufficient to promote the reaction of formaldehyde with the nitrogen oxide in the gas and to reduce the nitrogen oxide content in the gas to a desired level, or (B) formaldehyde-derived free radicals capable of reacting with nitrogen oxide when the temperature of the gas is lower than the temperature in (A) and the reaction with formaldehyde does not reduce the nitrogen oxide content to the desired level, whereby the nitrogen oxide content of the gas is reduced to the desired level. The free radicals may be generated by reacting formaldehyde with nitrogen or nitrogen oxide in the presence of a catalyst. Preferred catalysts comprise zirconium, cerium, phosphorus, vanadium, or mixtures thereof. Catalysts comprising zirconium in the plus four oxidation state, cerium in the plus four oxidation state, or mixtures thereof are particularly preferred catalysts for the reaction of formaldehyde with nitrogen oxide. In another embodiment, free radicals are obtained by reacting formaldehyde with nitrogen in the presence of a catalyst comprising vanadium or zirconium or a mixture thereof.

23 Claims, 1 Drawing Sheet

REDUCTION OF NITROGEN OXIDE IN EFFLUENT GASES USING FORMALDEHYDE AND/OR FORMALDEHYDE-DERIVED FREE RADICALS

CROSS REFERENCE TO RELATED APPLICATIONS

This application is a continuation-in-part of copending U.S. patent application Ser. Nos. 07/585,592 now U.S. Pat. No. 5,078,982 and 07/585,403 now abandoned, both filed on Sep. 20, 1990. These applications are hereby incorporated by reference.

FIELD OF THE INVENTION

The present invention related to a method of reducing nitrogen oxide emissions and thereby reducing pollution of the atmosphere. More particularly, the present invention relates to the alternate use of formaldehyde or free radicals derived from formaldehyde for reducing the nitrogen oxide content of combustion gases.

BACKGROUND OF THE INVENTION

There has been considerable effort devoted in recent years to solving various ecological and environmental problems such as air pollution, acid rain, etc. Combustion effluents and waste products from various sources are a major source of air pollution when discharged into the atmosphere. Unless the waste products are treated to remove deleterious components, the degradation of the environment will continue. Acid rain, forest and vegetation decline, changes int he ozone layer, harmful and irritating smog, etc., are examples of the results of the pollution of the atmosphere.

The common sources of pollution include internal combustion engines, industrial plants, utility boilers, gas turbines, and commercial establishments such as service stations, dry cleaners, etc. It has been estimated that power plants are responsible for about ⅓ of the annual $NO_x$ emissions while mobile sources such as automobiles and trucks are responsible for about 40% to about 50%. The types of air pollutants generated by such facilities include particulate emissions such as coal ash, sulphur compounds such as $SO_2$ and $SO_3$, carbon monoxide, ozone, and nitrogen oxides, commonly referred to collectively as "$NO_x$".

One of the common components found in polluted air is nitrogen dioxide ($NO_2$) which is known to be an extremely poisonous material. Nitrogen dioxide is introduced into the atmosphere from the various sources such as industrial plants producing nitric acid, but a major source of nitrogen dioxide is from nitric oxide (NO) formed by combustion processes of the types described above. The nitrogen oxide is formed during such combustion processes by (1) the reaction of nitrogen with atmospheric oxygen in the high temperature portion of the flame ("thermal fixation); and (2) the oxidation of organic nitrogen compounds in the fuel on burning. The nitric oxide formed on combustion is converted to nitrogen dioxide on contact with air in the atmosphere.

Various procedures have been suggested to remove the oxides of nitrogen form waste gases so that the gases may be discharged into the atmosphere without harm to the environment. Nitrogen oxides emissions from boilers, gas turbines and internal combustion engines have been reduced by modifying the design of the engine or boiler to be more efficient or to operate at a lower temperature. Other proposals for reducing nitrogen oxide emissions involve use of various chemicals to reduce the nitrogen oxide content of effluent gases by converting the nitrogen oxides to innocuous gases. Such chemical processes, however, generally require extremely high temperatures such as in the range of about 1600° to about 2000° F. and higher. The temperature of some of these chemical reactions for reducing nitrogen oxide content have been reduced by utilizing catalysts which are effective in promoting the reduction of nitrogen oxide, but using a catalyst has certain disadvantages such as the expense of the catalyst, the life of the catalyst, the expense and difficulty of contacting the combustion effluents with the catalyst, etc. Accordingly, there has been continued emphasis on procedure for reducing nitrogen oxide emissions which do not involve the direct use of catalysts. Various techniques for reducing $NO_x$ emissions from various combustion processes are described in the article entitled "Reducing $NO_x$ Emissions," *Power* September 1988, pp S-1 to S-13.

Among the chemicals which have been suggested as being useful in reducing the nitrogen oxide content of combustion effluents are nitrogen-containing compounds such as ammonia, urea, cyanuric acid, etc. For example, U.S. Pat. Nos. 3,900,554; 4,335,084; 4,743,436; 4,849,192; and 4,851,201 describe processes utilizing ammonia to reduce nitrogen oxide emissions.

The use of urea is described in U.S. Pat. Nos. 4,208,386; 4,325,924; 4,719,092; and 4,851,201. The use of cyanuric acid, and more specifically, the decomposition product of cyanuric acid, isocyanic acid, for reducing the nitrogen oxide content of combustion effluents is described in U.S. Pat. Nos. 4,731,924; 4,800,068; and 4,861,567; and by R. A. Perry and D. L. Siebers, *Nature* Vol. 324, 18/25, pp 657, 658. Perry proposes that isocyanic acid (HNCO) is formed from the decomposition of cyanuric acid when cyanuric acid is heated above about 330° C. When the isocyanic acid is mixed with the exhaust gas stream at temperatures 400° C. or higher, a series of reactions is proposed to occur that results in the loss of HCNO and NO.

U.S. Pat. Nos. 4,743,436 and 4,849,192 describe the process for treating effluent gases containing nitrogen oxides, sulfur trioxide, etc., wherein the effluent gas is first treated with ammonia to reduce the nitrogen oxide content and thereafter with methanol to reduce the sulfur trioxide content of the combustion effluent to $SO_2$ thereby minimizing the formation of ammonium bisulfate and sulfuric acid.

U.S. Pat. No. 3,867,507 describes a method for treating a stream of combustion effluents containing $NO_x$ and other contaminants wherein the stream is contacted initially with a hydrocarbon in the presence of oxygen to reduce the $NO_x$ to molecular nitrogen, and thereafter contacting the reduced stream with oxygen to oxidize all other contaminants to an oxidized state. The patentees indicate that any hydrocarbon, as well as oxygen-containing hydrocarbons, sulfur-containing hydrocarbons, nitrogen-containing hydrocarbons, etc. which yield carbon containing free radicals on pyrolysis can be used. Among the oxygenated hydrocarbons disclosed are alcohols, ethers, acids, ketones and aldehydes. A critical feature of the process is the ratio of total number of carbon atoms in the hydrocarbon per mole of $NO_x$. The number of carbons in the hydrocarbon may be from 1 to 12. The second critical feature is the $[O_2]/[C]$. The patentees further state that any carbon atoms bound to oxygen in the hydrocarbon compounds are not considered in the carbon-to-oxygen ratio, and this requirement excludes formaldehyde. Japanese Patent Publication No. 54-46172 describes the method for removing nitrogen oxide from waste combustion gases by adding alcohols or aldehydes to the combustion gas to reduce the nitrogen oxide at a gas-phase state in the presence of oxygen. The alcohols include methyl alcohol, ethyl alcohol, propyl alcohols and butyl alcohols. The aldehydes include formaldehyde, acid aldehyde, etc. The authors indicate that the reaction between the aldehyde or alcohol and the $NO_x$ in the gas can be conducted at temperatures of 200° C. to about 600° C., and more preferably, from about 400° C. to 600° C.

Canadian Patent 654,427 describes a process for removal of nitrogen oxides from $SO_2$ and/or $SO_3$-containing gases. The process involves spraying water containing reducing agents into the gases to be purified. Formaldehyde is disclosed as one example of a useful reducing agent. The patentees indicate that the process also is useful for removing nitrogen oxides from gases which do not contain $SO_2$ and/or $SO_3$, but in this case, $SO_3$ is added to the gas while the gas is sprayed with dilute sulfuric acid containing reducing compounds.

Addition of oxygen-containing hydrocarbons (alcohols, aldehydes and ketones) and/or their percursors for controlling nitrogen oxides in exhaust gases by conversion of NO to $NO_2$ is described in U.S. Pat. No. 4,350,669; U.K. Patent 1,572,118 and Japanese Patent Application Nos. 52-14619; 52-42461; 53-76968; and 53-128023. U.S. Pat. No. 4,530,669 describes methanol and formaldehyde as useful oxygen-containing hydrocarbons and methane, ethane and propane as examples of hydrocarbons.

SUMMARY OF THE INVENTION

An improved method is described for reducing the nitrogen oxide content of an effluent gas stream wherein the temperature of the gas varies. The improvement comprises alternately, depending upon the temperature of the gas, contacting the gas with (A) formaldehyde when the gas is at an elevated temperature which is sufficient to promote the reaction of formaldehyde with the nitrogen oxide in the gas and to reduce the nitrogen oxide content in the gas to a desired level, or (B) formaldehyde-derived free radicals capable of reacting with nitrogen oxide when the temperature of the gas is lower than the temperature in (A) and the reaction with formaldehyde does not reduce the nitrogen oxide content to the desired level, whereby the nitrogen oxide content of the gas is reduced tot he desired level.

The free radicals may be generated by reacting formaldehyde with nitrogen or nitrogen oxide in the presence of a catalyst. Examples of catalysts comprise zirconium, cerium, phosphorus, or vanadium, or mixtures thereof. Catalysts comprising zirconium in the plus four oxidation state, cerium in the plus four oxidation state, or mixtures thereof are particularly preferred catalysts for promoting the reaction of formaldehyde with nitrogen. Catalysts comprising zirconium and cerium are preferred catalysts for promoting the reaction of formaldehyde with nitrogen oxide.

DESCRIPTION OF THE PREFERRED EMBODIMENTS

Figure 1:
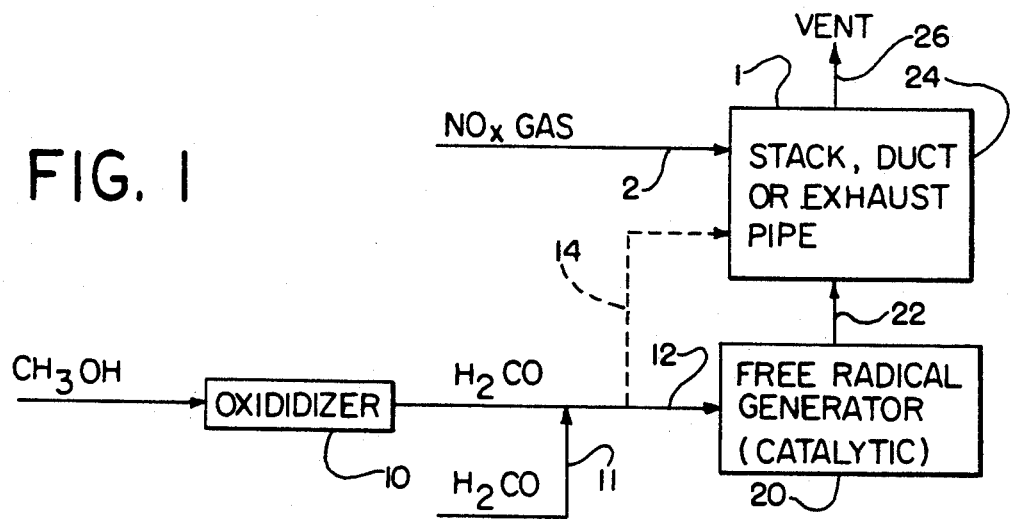
FIG. 1 is a flow diagram of one embodiment of the invention wherein a flue gas or exhaust gas containing $NO_x$ is treated with formaldehyde or formaldehyde derived free radicals.

Throughout the specification and claims, the terms "nitrogen oxide(s)" and "$NO_x$" are used in the generic sense to include the various nitrogen oxide compounds such as nitrous oxide ($N_2O$), nitric oxide (NO) and nitrogen dioxide ($NO_2$).

The process of the present of the present invention is useful particularly for treating effluent gases containing $NO_x$ where the temperature of the effluent gas is variable and/or is not sufficiently high to effect a reaction between formaldehyde and $NO_x$ in the absence of a catalyst. Although formaldehyde has been described as a reactant useful for reducing the $NO_x$ content of effluent gases, the reaction is not very efficient unless the gas is at a high temperature or the gas is heated to a high temperature prior to contact with the formaldehyde.

The present invention provides a process for treating such effluent gas containing $NO_x$ which is either at a temperature which is too low to promote an efficient non-catalytic reaction between added formaldehyde and $NO_x$, or the gas temperature fluctuates and is periodically at a temperature below the temperature at which an efficient non-catalytic reaction occurs between formaldehyde and $NO_x$. In particular, the process of the present invention is effective in treating such effluent gases since the process of the present invention comprises alternately, depending upon the temperature of the gas, contacting the gas with (A) formaldehyde when the gas is at an elevated temperature which is sufficient to promote the reaction of formaldehyde with nitrogen oxide and to reduce the nitrogen oxide content of the gas to the desired level, or (B) formaldehyde derived free radicals capable of reacting with nitrogen oxide when the temperature of the gas is lower than the temperature in (A) and the reaction with formaldehyde does not reduce the nitrogen oxide content to the desired level.

The formaldehyde-derived free radicals react with the nitrogen oxide in the gas at a lower temperature thereby reducing the nitrogen oxide content of the gas to the desired level.

The nitrogen oxide containing gas streams which can be treated in accordance with the method of the present invention may be derived from various mobile and stationary sources. Mobile sources include internal combustion engines such as buses, trucks and automobiles. Fixed or stationery sources of nitrogen oxide containing gases include stack gases from commercial and residential furnaces, kilns, residual oil and coal-fired utility boilers, industrial boilers, hydrocarbon-fueled power plants, gas turbines, incinerators, diesel engine generators, etc.

In accordance with the process of the present invention, formaldehyde and/or the formaldehyde-generated free radicals are brought into contact with the gas streams containing nitrogen oxides by introducing the formaldehyde or free radicals into the exhaust pipes of various engines or into the flues and stacks of power plants, utility boilers and other similar installations. For convenience, the area in which the formaldehyde or free radicals are mixed and reacted with the gas stream may be referred to in this specification and claims as the "reactor" or "reaction zone".

In order to be effective in reducing the nitrogen oxide content of the gas streams, the formaldehyde and the gas containing nitrogen oxides must be mixed at an elevated temperature such as above 700° F. In a particular embodiment, it has been discovered that formaldehyde can be utilized for reducing the nitrogen oxide content of a gas in the absence of catalysts at temperatures above 1000° F. and more often at temperatures between about 700°-2000° F. For example, it has been discovered that a stoichiometry of approximately 1$H_2CO$:2NO in the reaction zone at about 1200° F. is effective in eliminating approximately 80 to 90% of the nitric oxide in the gas stream. At lower temperatures, formaldehyde is still effective in reducing the nitric oxide content of the gases, but to a lesser degree and may require higher stoichiometries of formaldehyde to nitric oxide. Alternatively, in accordance with this invention, formaldehyde generated free radicals are added to the effluent gas when the gas is at a temperature at which the efficiency of the reaction between formaldehyde and $NO_x$ is below the desired level and there is insufficient reduction of $NO_x$. Although the temperature of the gas can be elevated by heating, this is costly in terms of energy source and/or equipment.

Figure 2:
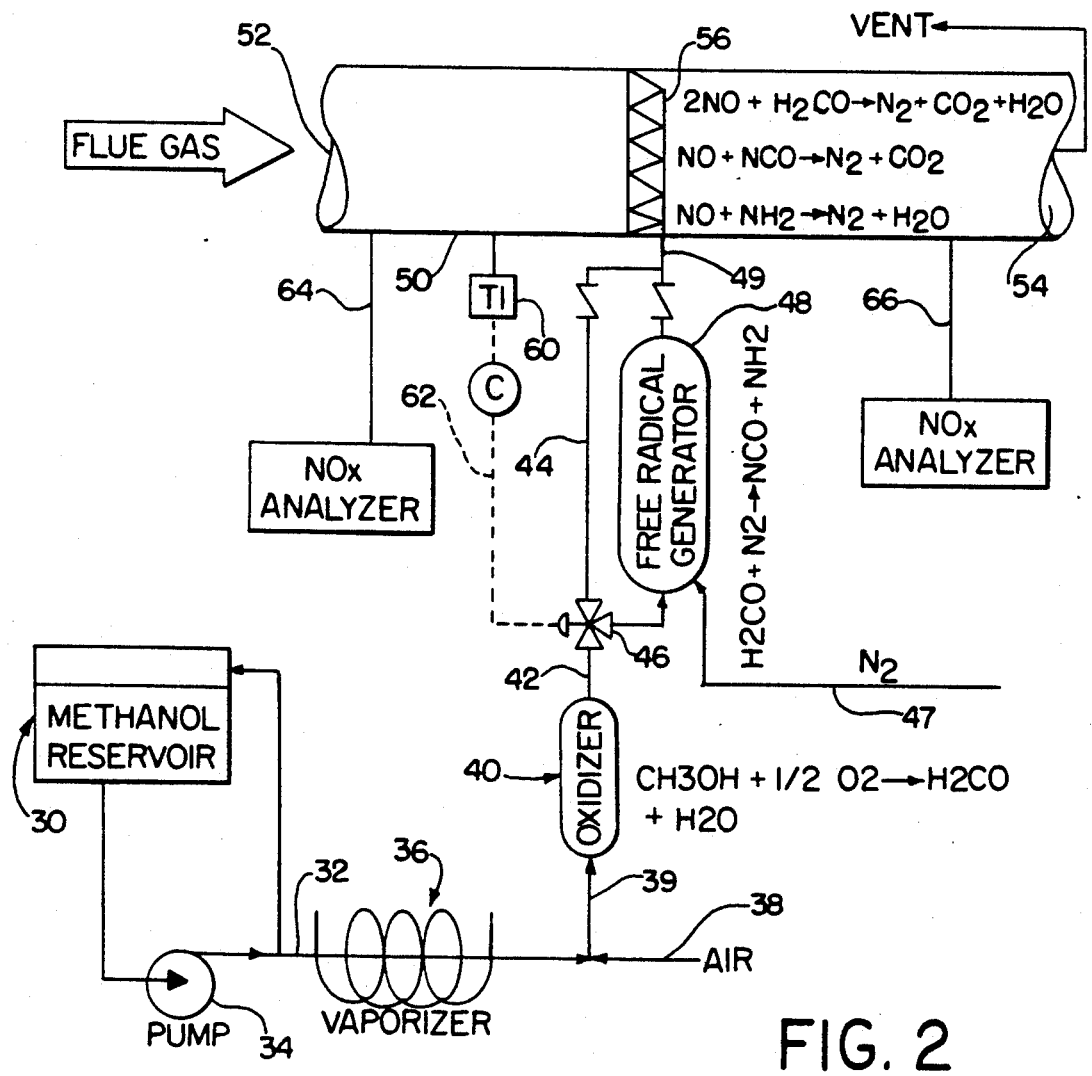
FIG. 2 is a flow diagram of another embodiment of the invention wherein a mixture of flue gas or exhaust gas containing $NO_x$ is contacted with formaldehyde or formaldehyde derived free radicals to reduce the $NO_x$ content of the gas.

FIGS. 1 and 2 illustrate the process of the present invention wherein formaldehyde may be introduced directly into a gas stack, duct or exhaust pipe (reactor), when the gas within the reactor is at an elevated temperature which is sufficient for an effective reaction (non-catalytic) between the $NO_x$ and the gas and the added formaldehyde. Alternatively, when the temperature of the gas within the reactor is too low for an efficient reaction so that the concentration of the $NO_x$ in the effluent gas is not reduced to a desired level, formaldehyde is introduced into a free radical generator, generally catalytic, wherein the formaldehyde is converted to free radicals which are then added to the reactor for reaction with $NO_x$. The free radicals generated from formaldehyde are capable of reacting with $NO_x$ at low temperatures, and thus, $NO_x$ can be removed from effluent gases if the temperature of the gas is not sufficiently high for an effective reaction of formaldehyde with $NO_x$. As discussed more fully below, the temperature of the gas within the reactor may be monitored with sensors, the $NO_x$ content of the gas near the reactor entrance and exit can be monitored, and this information utilized to determine whether formaldehyde or formaldehyde-generated free radicals should be added tot he reactor.

The amount of formaldehyde introduced into the reaction zone can be varied over a wide range, and preferred amounts will be determined form a consideration of the temperature and the amount of nitrogen oxide in the gas to be treated. Various mechanisms can be suggested to explain the effectiveness of formaldehyde in reducing the nitric oxide content of gas streams. Although applicants do not wish to be bound by any theory, it is generally believed that formaldehyde reacts with nitric oxide in accordance with the following equation.

$$2NO + H_2CO = N_2 + CO_2 + H_2O \tag{1}$$

Thus, one mole of formaldehyde should be effective in reacting with and removing two moles of nitric oxide from the gas stream resulting in the formation of innocuous gases and water. Alternatively, the presence of oxygen in accordance with the reaction may proceed as follows with the formation of $NO_2$ reaction 2.

$$NO + O_2 + H_2CO = NO_2 + CO_2 + H_2 \tag{2}$$

The $NO_2$ can be removed from the product gas by various techniques such as by absorption by an aqueous solution of sodium bisulfite.

The formaldehyde may be introduced as a solution of the formaldehyde in water (e.g., 37% by weight solution in water), as formaldehyde which has been vaporized prior to addition to the reaction zone, or as a formaldehyde derivative compound which decomposes and generates formaldehyde upon heating. Examples of such formaldehyde derivatives include paraformaldehyde, trioxane, etc. Throughout this specification and claims, the term formaldehyde includes formaldehyde in various forms and derivatives which decompose to form formaldehyde.

In one embodiment of the present invention, the formaldehyde utilized int eh method of the invention is derived from methanol. Formaldehyde can be readily produced form methyl alcohol and air (oxygen) by techniques well known to those skilled in the art. For example, methanol can be oxidized to formaldehyde in the presence of various catalysts such as iron-molybdena (Fe Mo oxides) at temperatures of from about 550° F. to 750° F. As the formaldehyde is produced int he reaction, it can be stored or used immediately in the method of the invention by advancing the freshly prepared formaldehyde directly into the reaction zone (e.g., stack or flue).

When the temperature of the effluent gas is not high enough to promote the reaction of formaldehyde with $NO_x$ to the desired level of reduction of $NO_x$ emission, the formaldehyde is converted to a gaseous product containing free radicals, and the free radicals are then added tot he effluent gas. The free radicals react with $NO_x$ in the effluent gas at these lower temperatures.

In one embodiment, the free radicals are generated by reacting formaldehyde with nitrogen in the presence of a catalyst comprising vanadium, zirconium, cerium or phosphorus, or mixtures thereof at a temperature from about 600° F. to about 1200° F. In one preferred embodiment, the gaseous product mixture is prepared in an atmosphere which does not contain any of the nitrogen oxide containing gas which is to be purified. In this manner, the catalyst is not subjected to the poisoning effect of the combustion gases and can be utilized in the reaction of formaldehyde in nitrogen for extended periods of time. Accordingly, this embodiment of the present invention is essentially a selective, thermal, non-catalytic reduction process (SNR) which can be conducted at temperatures lower than the temperatures normally utilized in SNR processes.

Since the catalytic reaction of formaldehyde with nitrogen is conducted at elevated temperatures, various forms of formaldehyde and formaldehyde derivatives which are thermally decomposable to form formaldehyde at elevated temperature as discussed above can be utilized in the reaction.

The catalysts which can be utilized to promote the reaction of formaldehyde with nitrogen include catalysts comprising vanadium, zirconium, cerium or phosphorus, or mixtures thereof. In one embodiment, the catalyst comprises vanadium and/or zirconium, and in one preferred embodiment, at least some of the vanadium and/or zirconium in the catalysts is present in the plus four oxidation state.

The oxides and sulfides of vanadium and zirconium are examples of compounds found to be useful as catalysts. Zirconium and vanadium in the oxide and sulfide forms are examples of compounds which contain zirconium and vanadium in the plus four oxidation state. A particular example of a zirconium compound containing zirconium in the plus four oxidation state is zirconium oxide, and a specific example of vanadium in the plus four oxidation state is $VO_2$ which may be present in small but sufficient quantity at certain crystal faces and discontinuities of $V_2O_5$. Vanadium and zirconium catalysts useful in the method of the present invention are commercially available, and they often contain at least some vanadium or zirconium in the plus four oxidation state along with other metals. For example, the catalysts useful in the method of the present invention may be commercially available mixed-metal oxide catalysts which contain at least some zirconium in the plus four oxidation state. Examples of unsupported powder catalysts include zirconium oxide and vanadium pentoxide powders from Aldrich Chemical Co. An example of a commercial supported zirconium-containing catalyst useful in the present invention is the zirconia catalyst ZR-0304T1/8 available from the Engelhard Corporation. An example of a commercial supported vanadium compound useful as a catalyst in the invention is the presulfated vanadium catalyst C116,3/16 available from United Catalysts, Inc.

The catalyst utilized in the method of the present invention may be formed in any conventional manner such as extrusion, tableting, pelleting, etc., or the active catalyst material can be supported on a carrier. The carrier is generally inert and may include silica, alumina, clay, alumina-silica, silicon carbide, zirconia, etc. The catalyst material can be deposited upon the carrier by techniques well known to those skilled in the art such as by depositing a solution containing the catalytic components on the carrier and thereafter drying and calcining the material. Utilizing these techniques, the catalytic components may be either coated on or impregnated in a carrier.

The reaction between formaldehyde and nitrogen in the presence of the above-identified catalysts generally is conducted at temperatures between about 600° F. to about 1200° F. More generally, the reaction is conducted at temperatures of from about 600° F. to about 990° F. The formaldehyde and nitrogen can be mixed and thereafter heated to the desired temperatures, or the formaldehyde and nitrogen can be preheated and combined at the desired elevated temperature to effect the reaction.

Although applicants have discovered that the reaction product gas obtained when formaldehyde is reacted with nitrogen in the presence of the above-described catalysts is effective in reducing nitrogen oxide content of gas streams, analysis and evaluation of the mechanism of the reaction has not been completed and is not presently known with any certainty. Accordingly, applicants do not wish to be bound by any particular theory. The significant fact for the purpose of the present invention is that the reaction product gas obtained by the catalytic reaction of formaldehyde with nitrogen in accordance with the method of the present invention is effective in reducing the nitrogen oxide content of effluent gases at temperatures which are lower than the temperatures used in SNR processes with formaldehyde. In some instances, the nitrogen oxide content of effluent gases can be reduced at very low temperatures including ambient temperature.

It has been suggested that formaldehyde and nitrogen react in the presence of a catalyst to form free radicals in accordance with the following reaction:

$$H_2CO + N_2 = NCO + NH_2 \tag{3}$$

The above postulated free radicals can then react with nitrogen oxide, and in particular, nitric oxide to form innocuous materials such as nitrogen, carbon dioxide and water in accordance with the following proposed reactions:

$$NO + NCO = N_2 + CO_2 \tag{4}$$

$$NO + NH_2 = N_2 + H_2O \tag{5}$$

As can be seen from the above reaction, one mole of formaldehyde should be effective in reacting with and removing two moles of nitric oxide from the gas stream resulting in the formation of water and carbon dioxide.

In a second embodiment free radicals can be generated by reacting formaldehyde with nitric oxide in the presence of a catalyst. This embodiment using nitric oxide is not as practical as the above embodiment using nitrogen. The reaction may occur in accordance with the following reaction to form NCO free radicals.

$$H_2CO + NO \rightarrow NCO + H_2O \tag{6}$$

When nitric oxide is brought into contact with formaldehyde in the presence of a catalyst for the reaction, the reaction can be conducted at temperatures of as low as 700° F., and with some catalyst combinations, the reaction is catalyzed to the point of about 100% nitric oxide reacted at about 1000° F. or greater.

Any catalyst which promotes the reaction of formaldehyde with nitric oxide can be utilized in the method of the present invention. Particular examples of catalysts which are useful include catalysts comprising zirconium, cerium, phosphorus or vanadium or mixtures thereof. In another embodiment, the catalyst is zirconium and/or cerium, and in a preferred embodiment at least some of the zirconium and cerium in the catalysts is present in the plus four oxidation state. Particularly improved results have been obtained utilizing a catalyst comprising both zirconium in the plus four oxidation state and cerium in the plus four oxidation state.

The oxides of zirconium, cerium, phosphorus and vanadium are examples of compounds found to be useful as catalysts. Zirconium and cerium in the oxide forms are examples of compound which contain zirconium and cerium in the plus four oxidation state. A particular example of a zirconium compound containing zirconium oxide in the plus four oxidation state is zirconium oxide, and a specific example of a cerium compound containing cerium in the plus four oxidation state is cerium oxide. Zirconium and cerium catalyst useful in the method of the present invention also are commercially available, and they often contain at least some zirconium or cerium in the plus four oxidation state along with other metals. The catalysts often contain other metals. For example, the catalysts useful in the method of the present invention may be commercially available mixed-metal oxide catalysts which contain at least some zirconium in the plus four oxidation state. An example of a commercial zirconium-containing catalyst useful in the present invention is the zirconia catalyst ZR-0304T1/8 available from the Engelhard Corporation.

The nitrogen oxide which can be reacted with formaldehyde in the presence of the above catalysts to form NCO free radicals may be purified nitric oxide available commercially from a variety of sources, or the nitric oxide can be obtained from combustion gases derived form mobile sources including internal combustion engines such are used in automobiles or fixed or stationery sources including stack gases from commercial and residential furnaces, kilns, residual oil and coal-fired utility boilers, industrial boilers, gas turbines, incinerators, diesel engine generators, etc. When the nitric oxide source is a post combustion gas, the gas preferably is pretreated to remove undesirable combustion products such as soot. It is preferred to use a commercial source of purified NO in the reaction in order to produce NCO free radicals free of undesirable side products. The use of purified NO also results in longer catalyst life since the catalyst is not contaminated by soot and other combustion by-products.

Embodiments of the present invention are illustrated in FIGS. 1 and 2. In FIG. 1, formaldehyde may be introduced directly into the stack, duct or exhaust pipe (reactor) 24 as indicated by line 14, or the formaldehyde may be advanced into a free radical generator 20 where the formaldehyde is converted under catalytic conditions to a gaseous product containing free radicals which are advanced as indicated by line 22 to the stack, duct, or exhaust pipe 24 through which an $NO_x$ effluent gas is passed as indicated by line 2. In accordance with the present invention, the formaldehyde is fed directly into the stack 24 through line 14 when the temperature of the $NO_x$ containing effluent gas is sufficiently high to promote the reaction of the formaldehyde with the $NO_x$ to reduce the $NO_x$ content of the gas to the desired level. When the temperature of the gas is not sufficient to promote the reaction of formaldehyde with $NO_x$ to the desired degree, the formaldehyde is diverted to the free radical generator 20, and the resultant gas containing free radicals is then added to the stack 24 where the free radicals are capable of reacting with the $NO_x$ in the gas at the lower temperature. The gas containing a reduced amount of $NO_x$ may then be vented to the atmosphere shown by line 26. As illustrated in FIG. 1, the formaldehyde may be prepared from methanol by oxidizing methanol in an oxidizer 10. The formaldehyde derived from the oxidizer may then be utilized in the method of the invention.

FIG. 2 is another flow diagram illustrating in the present invention in more detail. Methanol may be stored in reservoir 30 and advanced by pump 34 through a vaporizer 36. The methanol vapors may then be mixed with air which is introduced to conduit 38. The mixture of vaporized methanol and air is then advanced through conduit 39 to the oxidizer 40 where the methanol is oxidized to formaldehyde and water. Formaldehyde is removed from the oxidizer and fed either to the free radical generator 48 through conduit 46 or directly to reactor 50 which may be a gas stack, gas duct or exhaust pipe through conduits 44 and 49. The formaldehyde is advanced to either free radical generator 48 or reactor 50 by adjusting switch 46. In accordance with the present invention, the formaldehyde is advanced directly to reactor 50 through conduits 44 and 49 when the temperature of the flue gas passing through reactor 50 is sufficiently high to promote an efficient reaction between the formaldehyde and the $NO_x$ in the gas thereby reducing the $NO_x$ content of the flue gas to the desired level. The temperature of the gas within reactor 50 is monitored by a temperature sensor and indicator 60, and the effectiveness of the formaldehyde or the free radicals introduced into reactor 50 in reducing the $NO_x$ content of the gas is determined by comparing the amount of $NO_x$ in the gas as it initially enters into reactor 50 with the $NO_x$ content of the gas after it is treated with the formaldehyde or the free radicals. The $NO_x$ content of the gas as it enters into reactor 50 is determined by analyzing samples of the flue gas taken from near the inlet of reactor 50 shown by conduit 64 to the $NO_x$ analyzer. The $NO_x$ content of the gas after treatment is determined by periodically analyzing samples of the gas near the exit of reactor 50 through conduit 66 to an $NO_x$ analyzer.

When the temperature of the flue gas within reactor 50 is too low for an effective reaction which may be indicated by an undesired $NO_x$ level in the gas exiting reactor 50, the formaldehyde obtained form oxidizer 40 is diverted through switch 46 to the free radical generator 48 where the formaldehyde is reacted with nitrogen in the presence of a catalyst to form a gaseous product containing free radicals such as NCO and $NH_2$. The gaseous product containing free radicals is then advanced through conduit 49 into reactor 50 and sprayed into the flue gas with spraying system 56.

When the temperature of the flue gas entering reactor 50 is at a temperature or increases to a temperature which is sufficient to promote a reaction between formaldehyde and the $NO_x$ in he gas, the position of switch 46 is changed so that the formaldehyde from oxidizer 40 will pass through conduit 44 rather than conduit 46, and the formaldehyde is injected directly into reactor 50 through conduit 49. Thus, as can be seen, formaldehyde or formaldehyde-generated free radicals can be alternately introduced into reactor 50 depending upon the temperature of the flue gas within a reactor 50 or, alternatively, depending upon the $NO_x$ content of the gas near the exit of reactor 50. For example, when the $NO_x$ content of the gas near the exit of reactor 50 approaches a level which is unacceptable (i.e., the $NO_x$ content of the gas is higher than desired), switch 46 may be activated through appropriate devices to advance the formaldehyde through conduit 46 into the free radical generator. When the temperature of te gas within and near the entrance of reactor 50 increases switch 46 may be activated through appropriate devices to by-pass the free radical generator and advance the formaldehyde through conduits 44 and 49 directly into the flue gas.

The amount of formaldehyde or free radicals supplied to the flue, smokestack or other exhaust device can be varied in accordance with the amount of $NO_x$ in the gas and the desired objectives. Generally, the amount should be sufficient to react with the nitrogen oxides in the combustion gas based upon the general assumption that one mole of formaldehyde can theoretically react and remove two moles of NO from the gas.

Whether the flue gas is treated with formaldehyde or free radicals in accordance with the present invention maybe readily determined by one skilled in the art depending upon the desired objective with regard to level of NO in the gas after treatment. For example, if it is desired to reduce the $NO_x$ content of the gas to less than 200 ppm, the effluent gas is treated with formaldehyde so long as the temperature of the effluent gas is sufficiently high to promote the reaction of formaldehyde with $NO_x$ and thereby reduce the $NO_x$ content of the gas to the desired level. When the conditions within the gas duct of reactor (e.g., temperature, flow rate, etc.) are such that the $No_x$ content of the gas exiting the reactor approaches or is greater than 200 ppm. then, in accordance with the present invention, the flow of formaldehyde into the reactor is stopped and formaldehyde generated free radicals are introduced into the reactor to reduce the $NO_x$ content of the gases exiting the reactor to the desired level of less than 200 ppm. When the temperature sensor indicates that the flue gas entering the reactor has increased in temperature sufficiently, the flow of free radicals is stopped and formaldehyde is once again introduced into the reactor. If the desired level of $NO_x$ in the exiting gas is 100 ppm, higher flue gas temperatures are required and, as a result, the procedure may involve the introduction of free radicals into the reactor for a greater period of time unless the flue gas being treated is supplied to the reactor at an elevated temperature.

As can be seen from the above discussion, it is not possible to state with any certainty a precise temperature for alternating between formaldehyde and formaldehyde-generated free radicals. The temperature is dependent on a number of factors which may be varied or controlled by one skilled in the art. In general, however, formaldehyde is utilized when the temperature of the effluent gas is above 1000° F. and more generally above 1100° F. When the temperature is below 1000° F., formaldehyde-generated free radicals are more effective in reacting with the $NO_x$ and are preferred.

While the invention has been explained in relation to its preferred embodiments, it is to be understood that various modifications thereof will become apparent to those skilled in the art upon reading this specification. Therefore, it is to be understood that the invention disclosed herein is intended to cover such modifications as are embraced within the scope of the appended claims.

We claim:

1. A process for reducing the nitrogen oxide content of a gas wherein the temperature of the gas varies which comprises alternately, contacting the gas with
   (A) formaldehyde when the gas is at a temperature which is sufficient to promote the reaction of formaldehyde with the nitrogen oxide in the gas and to reduce the nitrogen oxide content in the gas to a desired level, and
   (B) free radicals derived by reacting formaldehyde with nitrogen or nitric oxide in the presence of a catalyst wherein the free radicals are capable of reacting with nitrogen oxide when the temperature of the gas is lower than the temperature in (A) and the reaction with formaldehyde does not reduce the nitrogen oxide content to the desired level, whereby the nitrogen oxide content of the gas is reduced to the desired level.

2. The process of claim 1 wherein the nitrogen and formaldehyde are reacted at a temperature of from about 600° F. to about 990° F.

3. The process of claim 1 wherein the catalyst comprises vanadium or zirconium of a mixture thereof.

4. The process of claim 1 wherein the catalyst comprises zirconium.

5. The process of claim 1 wherein the catalyst comprises a mixture of vanadium and zirconium.

6. The process of claim 1 wherein the formaldehyde is obtained from methanol.

7. The process of claim 1 wherein the free radicals in (B) are derived by reacting formaldehyde with nitric oxide in the presence of a catalyst comprising zirconium, cerium, phosphorus, vanadium, or mixtures thereof.

8. The process of claim 7 wherein the catalyst comprises zirconium, cerium, or a mixture thereof.

9. The process of claim 7 wherein the catalyst comprises zirconium, in the plus four oxidation state, cerium int eh plus four oxidation state, or a mixture thereof.

10. The process of claim 7 wherein the catalyst comprises a mixture of zirconium in the plus four oxidation state and cerium in the plus four oxidation state.

11. The process of claim 1 wherein the gas is contacted with (A) formaldehyde when the gas is at a temperature exceeding about 1000° F., and the gas is contacted with (B) formaldehyde-derived free radicals when the gas temperature is below about 1000° F.

12. The process of claim 1 wherein the formaldehyde-derived free radicals are selected from NCO and mixtures of NCO and $NH_2$.

13. The process of claim 12 wherein the free radicals are comprised of a mixture of NCO and $NH_2$.

14. The process of claim 1 wherein the gas stream is an engine exhaust gas stream.

15. The process of claim 1 wherein the gas stream is a smoke stack or boiler exhaust gas stream.

16. The process of claim 1 wherein the free radicals in (B) are derived by reacting formaldehyde with nitrogen in the presence of a catalyst comprising zirconium, samarium and mixtures thereof at a temperature below about 1200° F.

17. The process of claim 1 wherein the catalyst comprises zirconium.

18. A process for reducing the nitrogen oxide content of a gas wherein the temperature of the gas varies which comprises alternately contacting the gas with
   (A) formaldehyde when the gas is at a temperature which is sufficient to promote the reaction of formaldehyde with the nitrogen oxide in the gas and to reduce the nitrogen oxide content of the gas to a desired level; and
   (B) free radicals derived by reacting formaldehyde with nitrogen in the presence of a catalyst comprising vanadium or zirconium, or a mixture thereof at a temperature of from about 600° F. to about 990° F. wherein the free radicals are capable of reacting with nitrogen oxide when the temperature of the gas is lower than the temperature in (A) and the formaldehyde is obtained by the oxidation of methanol.

19. The process of claim 18 wherein the catalyst in (B) is a zirconium-containing catalyst, and the temperature of the reaction between formaldehyde with nitrogen is from about 820° F. to about 960° F.

20. The process of claim 18 wherein the gas is contacted with (A) formaldehyde when the gas is at a temperature exceeding about 1000° F., and the gas is contacted with (B) formaldehyde-derived free radicals when the gas temperature is below about 1000° F.

21. Apparatus for reducing the nitrogen oxide content of a gas stream wherein the temperature of the gas varies comprising (A) container means containing formaldehyde or methanol,
(B) means for converting methanol to formaldehyde when the container means contains methanol,
(C) means for generating free radicals from the formaldehyde, nitrogen or nitric oxide, and a catalyst,
(D) means for sensing the temperature of the gas stream.
(E) means for contacting the nitrogen oxide containing gas stream with formaldehyde or formaldehyde-derived free radicals, and
(F) means for regulating and directing the flow of either formaldehyde or formaldehyde-derived free radicals to contact with the gas stream dependent upon the temperature of the gas stream.

22. The apparatus of claim 21 wherein the means (C) for generating free radicals form formaldehyde comprise a source of nitrogen and a catalyst capable of promoting the reaction of formaldehyde with nitrogen to generate free radicals.

23. The apparatus of claim 21 wherein means (F) for regulating and directing a flow of formaldehyde or formaldehyde-derived free radicals direct a flow of formaldehyde to contact the gas stream when the gas is at a temperature which is sufficient to promote the reaction of formaldehyde with the nitrogen oxide in the gas and to reduce the nitrogen oxide content the gas to a desired level, or the means direct a flow of formaldehyde-derived free radicals when the temperature of a gas is at a lower temperature.

* * * * *